United States Patent
Moalemi et al.

(10) Patent No.: US 9,536,665 B2
(45) Date of Patent: Jan. 3, 2017

(54) HIGH CAPACITANCE SINGLE LAYER CAPACITOR

(71) Applicant: Knowles Capital Formation, Inc., Itasca, IL (US)

(72) Inventors: Ali Moalemi, San Diego, CA (US); Euan Patrick Armstrong, Pasadena, CA (US)

(73) Assignee: Knowles Capital Formation, Inc., Itasca, IL (US)

(*) Notice: Subject to any disclaimer, the term of this patent is extended or adjusted under 35 U.S.C. 154(b) by 5 days.

(21) Appl. No.: 14/859,657

(22) Filed: Sep. 21, 2015

(65) Prior Publication Data

US 2016/0012969 A1    Jan. 14, 2016

Related U.S. Application Data

(63) Continuation of application No. 13/475,771, filed on May 18, 2012, now Pat. No. 9,165,716, which is a continuation-in-part of application No. 13/168,879, filed on Jun. 24, 2011, now Pat. No. 9,324,499.

(51) Int. Cl.
| | |
|---|---|
| *H01G 4/06* | (2006.01) |
| *H01G 4/30* | (2006.01) |
| *H01G 4/228* | (2006.01) |
| *H01G 4/005* | (2006.01) |
| *H01G 4/012* | (2006.01) |
| *H01G 4/232* | (2006.01) |

(Continued)

(52) U.S. Cl.
CPC .............. *H01G 4/012* (2013.01); *H01G 4/12* (2013.01); *H01G 4/228* (2013.01); *H01G 4/232* (2013.01); *H01G 4/252* (2013.01); *Y10T 29/417* (2015.01)

(58) Field of Classification Search
CPC .......... H01G 4/30; H01G 4/012; H01G 4/005; H01G 4/12
USPC .... 361/321.1, 301.4, 321.2, 748, 306.3, 303
See application file for complete search history.

(56) References Cited

U.S. PATENT DOCUMENTS

| | | |
|---|---|---|
| 5,825,608 A | 10/1998 | Duva et al. |
| 6,058,004 A | 5/2000 | Duva et al. |
| 6,208,501 B1 | 3/2001 | Ingalls et al. |

(Continued)

FOREIGN PATENT DOCUMENTS

| | | |
|---|---|---|
| CN | 1298788 A | 6/2001 |
| CN | 1601673 A | 3/2005 |

OTHER PUBLICATIONS

Chinese Office Action dated Dec. 1, 2014, issued in parallel Chinese Application No. 201210208320.7, translation unavailable (15 pages).

(Continued)

*Primary Examiner* — Eric Thomas
*Assistant Examiner* — Arun Ramaswamy
(74) *Attorney, Agent, or Firm* — Foley & Lardner LLP

(57) ABSTRACT

A high capacitance single layer ceramic capacitor having a ceramic dielectric body containing one or more internal electrodes electrically connected to a metallization layer applied to the side and a top or bottom surface and a metallization pad electrically isolated from the metallization side and the top or bottom surface by a castellation or a via or separated by a dielectric insulating band positioned between the electrodes around the perimeter of the ceramic body and separating the top and bottom surfaces.

11 Claims, 6 Drawing Sheets

(51) Int. Cl.
*H01G 4/252* (2006.01)
*H01G 4/12* (2006.01)

(56) References Cited

U.S. PATENT DOCUMENTS

| | | |
|---|---|---|
| 6,337,791 B1 * | 1/2002 | Monsorno ............... H01G 4/30 |
| | | 361/306.1 |
| 6,366,443 B1 | 4/2002 | Devoe et al. |
| 6,542,352 B1 | 4/2003 | Devoe |
| 6,576,497 B2 | 6/2003 | Ahiko et al. |
| 6,587,327 B1 | 7/2003 | Devoe |
| 6,661,639 B1 | 12/2003 | Devoe et al. |
| 6,690,572 B2 | 2/2004 | Liebowitz |
| 6,751,082 B2 | 6/2004 | Devoe et al. |
| 6,753,218 B2 | 6/2004 | Devoe |
| 6,816,356 B2 | 11/2004 | Devoe |
| 6,969,647 B2 | 11/2005 | Devoe et al. |
| 7,136,274 B2 | 11/2006 | Hwang et al. |
| 8,068,330 B2 | 11/2011 | Togashi |
| 2001/0002606 A1 | 6/2001 | Nakamura et al. |
| 2003/0011962 A1 | 1/2003 | Yamamoto |
| 2004/0207972 A1 | 10/2004 | Kazama |
| 2010/0014213 A1 | 1/2010 | Wozniak et al. |
| 2010/0033896 A1 | 2/2010 | Togashi |
| 2010/0039749 A1 | 2/2010 | Ritter et al. |

OTHER PUBLICATIONS

Singapore Search Report and Written Opinion for Singapore Patent Application No. 201204691-8; issued by the Danish Patent and Trademark Office on Dec. 14, 2012; date of mailing Jan. 11, 2013 (17 pages).

* cited by examiner

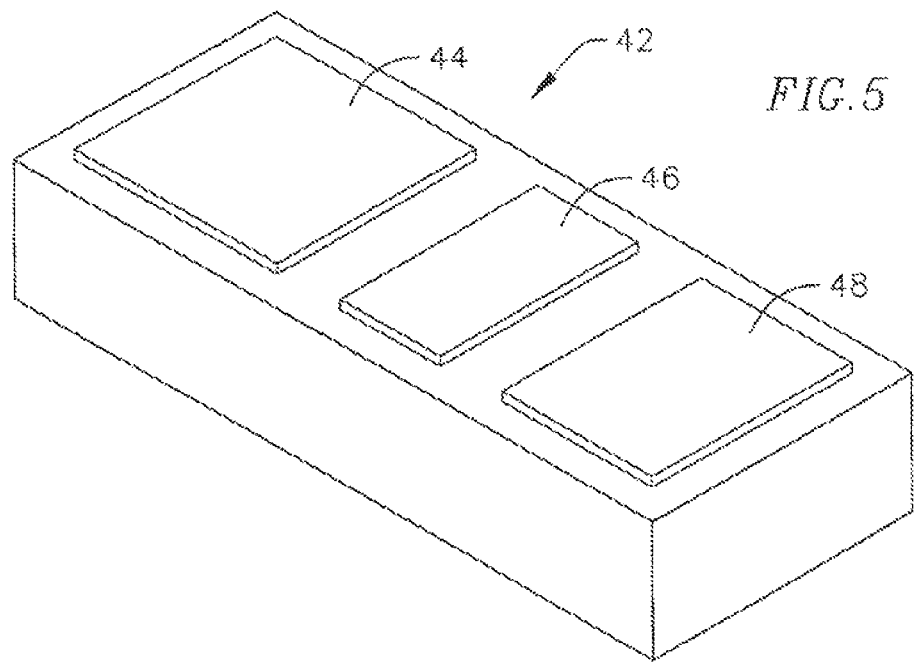
FIG.5
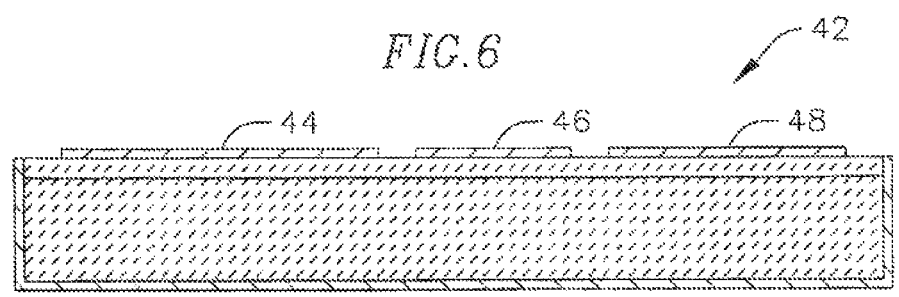
FIG.6
FIG.7
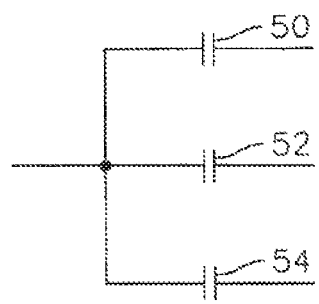
FIG.8
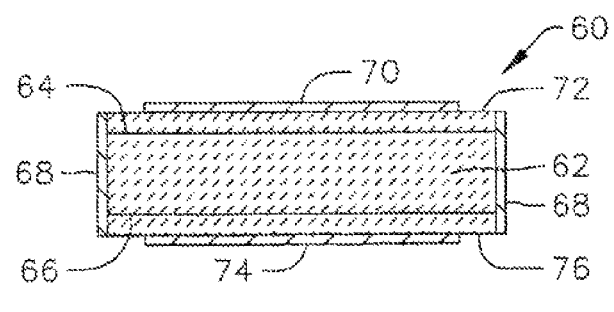

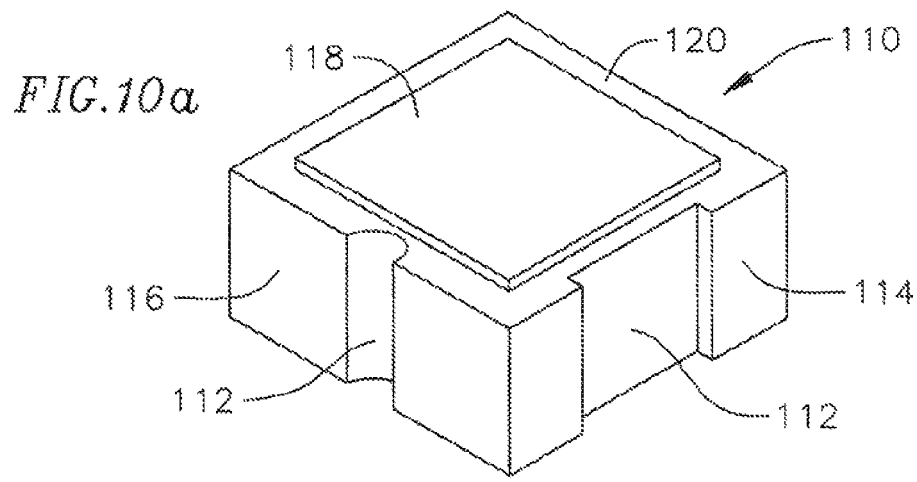
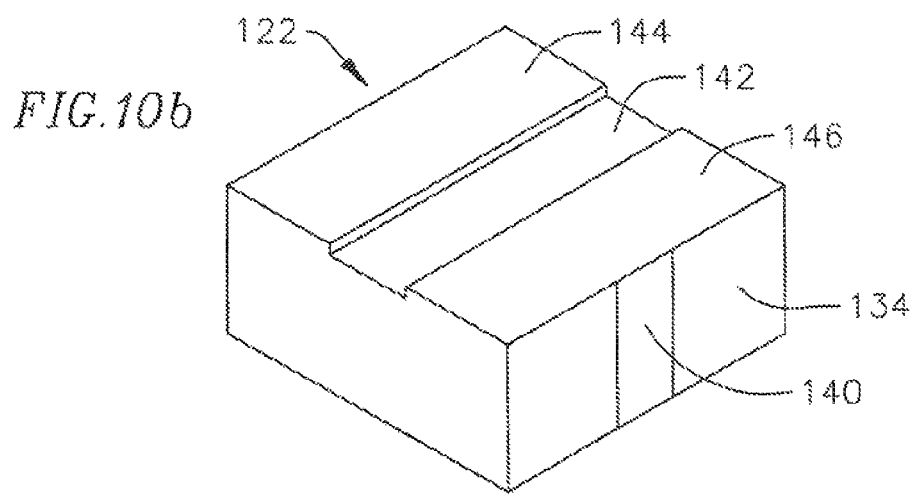
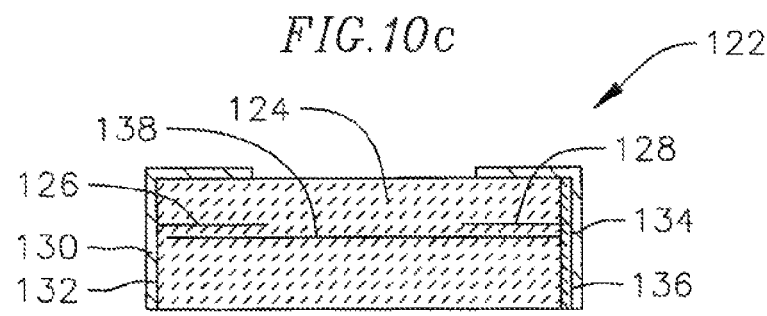

HIGH CAPACITANCE SINGLE LAYER CAPACITOR

CROSS-REFERENCE TO RELATED APPLICATION(S)

This application is a Continuation of U.S. patent application Ser. No. 13/475,771, filed May 18, 2012, which is a continuation-in-part of U.S. patent application Ser. No. 13/168,879, filed Jun. 24, 2011, entitled HIGH CAPACITANCE SINGLE LAYER CAPACITOR, the contents of which are expressly incorporated herein in their entirety.

BACKGROUND OF THE INVENTION

This invention relates to single layer capacitors, and more particularly, to high capacitance single layer ceramic capacitors and a method of making the capacitors.

Single layer ceramic capacitors have a useful form factor for assembly into electrical circuits which are present on printed circuit boards or integrated circuits within chip carriers or other packages where space is limited. Dimensions of the ceramic capacitor can be matched with the limitations within the printed circuit board or chip carrier holding the integrated circuit. Typically the bottom surface of a ceramic capacitor is soldered to or connected with conductive epoxy to the surface of the printed circuit board and the top face of the ceramic capacitor presents one or more electrically conductive pads that serve as another circuit connection end point. Typically, single layer ceramic capacitors are produced by metallizing two faces of a thin sheet of sintered ceramic material. The metallized ceramic sheet is then cut to size by sawing or abrasive cutting techniques. While the form factor of these capacitors is desirable, the amount of capacitance that can be achieved limits their usefulness in certain applications, particularly when design considerations require particularly small or particularly thin capacitors. In such circumstances, the capacitor does not have sufficient structural strength to withstand undesirable fracturing or chipping during routine handling during assembly into circuits. Consequently design tradeoffs must be made between using thicker ceramic layers for greater strength and thinner ceramic layers for greater capacitance.

Prior attempts to achieve higher capacitance in a single layer capacitor while maintaining structural strength include using a flat, horizontal capacitor with metallization on its lower side having a gap. The problem with this design is that it creates unwanted resonances at frequencies above a few gigahertz. Another approach has been to use standing dielectric chips with opposed metallized surfaces and with metal leads attached to the respective surfaces. Problems with this design is that leads are fragile and require extreme care during fabrication, shipping, handling and soldering in place to traces. In addition, standing leaded capacitors produce significant signal resonances, especially for frequencies above a few gigahertz. Further attempts to produce higher capacitance single layer capacitors include multi-layer materials laminated together. These multi-layers include a ceramic dielectric material and a ceramic/metal composite material sheet. A problem with this design is that the manufacturing process includes laminating sheets together and the ceramic/metal composite material is quite expensive. Yet another ceramic capacitor design includes at least one interior metallization plane or plate and a multiplicity of vias performing multiple redundant electrical connections within the capacitor. Such designs are extremely difficult to manufacture to provide for interior metallization planes or plates connected through a multiplicity of vias.

Consequently, a need exists for a high capacitance single layer ceramic capacitor which is inexpensive and easy to manufacture.

SUMMARY OF THE INVENTION

The present invention provides a monolithic single layer capacitor having high capacitance and structural strength which is easily and inexpensively manufactured. The capacitor of the present invention provides for electrical connections to be made on top and bottom opposing surfaces. The capacitor provides for higher capacitance values than with existing designs while still maintaining form factor and high structural strength. The ceramic capacitor includes a continuous metallization applied to one to five surfaces of a ceramic body which makes contact within one or more internal electrodes. One or more further metallization pads are applied to the top surface of the capacitor. Electrical connection to an external circuit are achieved by attaching to the top and bottom surfaces of the capacitor. The capacitor can be manufactured through the use of a green ceramic bar which is built upon with one or more internal electrodes. The bar is cut and individual chips fired. The capacitor is metallized on all sides and the top pad is formed by removal of a portion of the metallization using a laser, mechanical milling or other process to isolate a top conductive pad. Alternatively, a passivation material on the surface of the capacitor can be applied prior to isolate the top conductive pad.

The one or more internal electrodes can extend partly or the whole width of the capacitor and are in contact with a conductive metallization layer positioned on one of the sides and a top or bottom surface of the ceramic body. During the manufacturing process, castellation holes or openings can be cut or drilled through the width of the ceramic body along an edge surface, which during the manufacturing process, can be completely filled or have only an inside surface coated.

For other particular applications, the internal electrode and the bottom conductive pad can be electrically connected by a through via. The via would extend through the entire height of the ceramic body and is drilled after the dielectric sheets are stacked. The via would be filled with a conductive material separately or as part of forming the top and bottom conductive pads.

In yet another alternative embodiment, the capacitor would have a ceramic dielectric body having at least two internal electrodes that extend across the whole width of the device which are separated by a layer of dielectric material of known thickness. Each internal electrode is in contact with a conductive metallization layer positioned on at least a portion of one of the sides and a top or bottom surface of the ceramic body. The two opposing metallization layers forming the top and bottom conductive pads are separated by an electrically insulating material that extends around the perimeter of the device penetrating into the body of the device along the sides.

BRIEF DESCRIPTION OF THE DRAWINGS

FIG. 5 is a perspective view of another alternative embodiment single layer capacitor of the present invention;

FIG. 6 is a cross-sectional view of the capacitor of FIG. 5;

FIG. 7 is an electrical schematic of the capacitor of FIG. 5;

FIG. 8 is a cross-sectional view of another alternative embodiment single layer capacitor of the present invention;

FIG. 10a is a perspective view of another alternative embodiment single layer capacitor of the present invention;

FIG. 10b is a perspective view of another alternative embodiment single layer capacitor of the present invention;

FIG. 10c is a cross-sectional view of the capacitor of FIG. 10b;

FIG. 11b is a cross-sectional view of FIG. 11a;

FIG. 12b is a cross-sectional view of FIG. 12a.

DETAILED DESCRIPTION OF THE INVENTION

Figure 1:
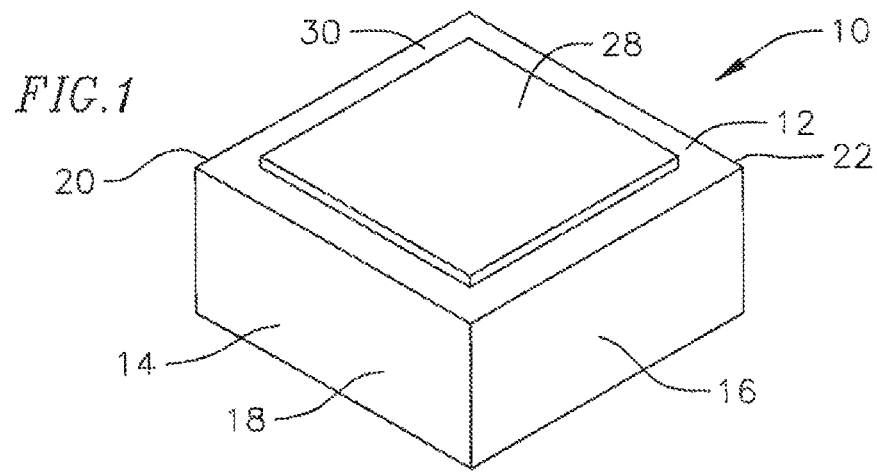
FIG. 1 is a perspective view of a single layer capacitor of the present invention.
Figure 2:
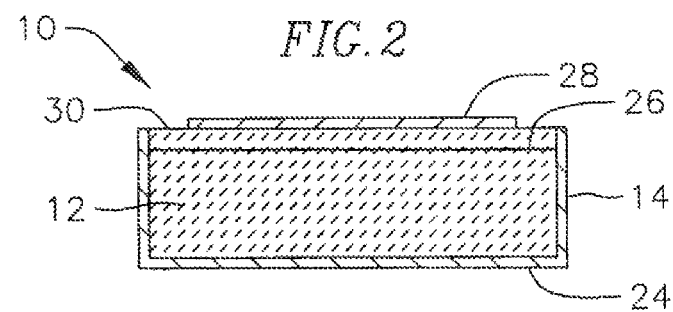
FIG. 2 is a cross-sectional view of the capacitor of FIG. 1.

As shown in FIGS. 1 and 2, the present invention provides a high capacitance surface mountable single layer ceramic capacitor 10 having high structural strength which is easy and inexpensive to manufacture. The capacitor includes a ceramic dielectric layer 12 having a partial or continuous metallization layer 14 applied to all four side surfaces 16, 18, 20, 22 and bottom surface 24. The dielectric layer 12, also referred herein as the ceramic body, includes an internal electrode 26 which extends across an entire width of the ceramic body and is in electrical contact with the metallization layer 14, as shown for example in FIG. 2 on either side 16 and 20. The capacitor further includes a metallization pad 28 positioned on the top surface 30 of the ceramic body 12.

Electrical connections to an external circuit can be made by attaching to the top metallization pad 28 and the bottom metallization layer 14 on the bottom surface 24 or to sides 16, 18, 20 and 22. The capacitance value within the capacitor can be described by the formula $C=eA/d$ where $e$=the permitivity of the dielectric body material, $A$=the area of the top pad 28, and $d$=the distance between the top pad 28 and the electrode 26. Unlike standard single layer capacitors, the distance $d$ can be minimized without compromising structure and strength of the component by the inclusion of the electrode. The distance $d$ is smaller because the positioning of the electrode yet the strength of the capacitor is achieved by having a thickness of material below the electrode.

Figure 3:
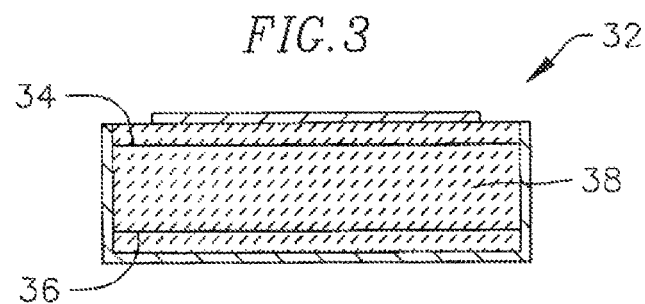
FIG. 3 is a cross-sectional view of an alternative single layer capacitor of the present invention.

Although FIGS. 1 and 2 illustrate a single layer ceramic capacitor having a single electrode 26, multiple electrodes can be incorporated as shown in FIG. 3 wherein capacitor 32 includes two or more electrodes as shown by 34 and 36 positioned within the ceramic dielectric body 38.

The capacitor can be manufactured by using a green ceramic bar, and built upon with one or more internal electrodes by positioning the electrodes in between individual layers of ceramic dielectric material. The ceramic material can be Class 1, 2 or 3 ceramic or any other ceramic deemed suitable for manufacture of multi-layer ceramic capacitors or single layer capacitors. The resulting fired capacitor is a single layer dielectric which is then metallized on all six sides by plating. The top pad 28 is then formed by removing the outer portions of the metallization from the top surface using a laser, mechanical milling or other technique to create the top conductive plate.

Figure 4:
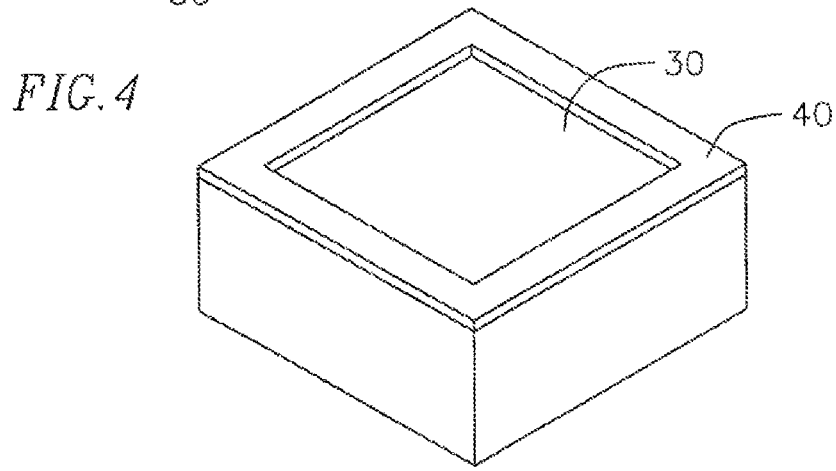
FIG. 4 is a perspective view of another alternative embodiment single layer capacitor of the present invention.

Alternatively, as shown in FIG. 4, prior to metallizing, a passivation surface such as a non-plateable glass or other insulating material 40 can be applied onto the top surface 30. The bar is then cut into discrete components. When the capacitors are metallized, the passivation material creates a gap between the plated sides and the top pad 28. The passivation material creates the gap between the top conductive plate and the bottom metallization that is connected to the internal conductive electrode. FIGS. 1 through 4 illustrate a square capacitor, however, as shown in FIG. 5, a capacitor 42 can be rectangular and can contain a number of top conductive pads 44, 46 and 48. The size of pads 44 through 48 can be the same or different. Utilizing a plurality of conductive pads can create a capacitor array wherein the pad sizes can be altered, or customized so that each capacitor value 50, 52 and 54 can be different as shown in FIG. 7.

FIG. 8 illustrates yet another embodiment single layer capacitor 60 of the present invention. Capacitor 60 is a floating capacitor which is two capacitors in series. Capacitor 60 includes a ceramic body 62 having electrodes 64 and 66 positioned therein similar to FIG. 3. Metallization layer 68 is applied to all four sides of the ceramic body and metallization pad 70 is positioned on the top surface 72 and a metallization pad 74 is position on bottom surface 76 of the ceramic body. Pads 70 and 74 are formed similar to the pads in the other embodiments.

The capacitor of the present invention, for example is not restricted to but can have dimensions ranging from 0.010"× 0.010" to 0.090"×0.090" for square versions and is not restricted to but can have thicknesses ranging from 0.003" to 0.020". Some of the advantages of the present invention include higher capacitance per volume and the ability to use various dielectrics which result is a wide capacitance range. The capacitor eliminates the need for high cost materials and provides the ability to make an array of single layer capacitors of any size and different capacitance values within the same capacitor strip. The capacitor of the present invention further allows the capacitance values to be customized, and the utilization of thin dielectric layers to provide high capacitance values without sacrificing structural strength.

Figure 9A:
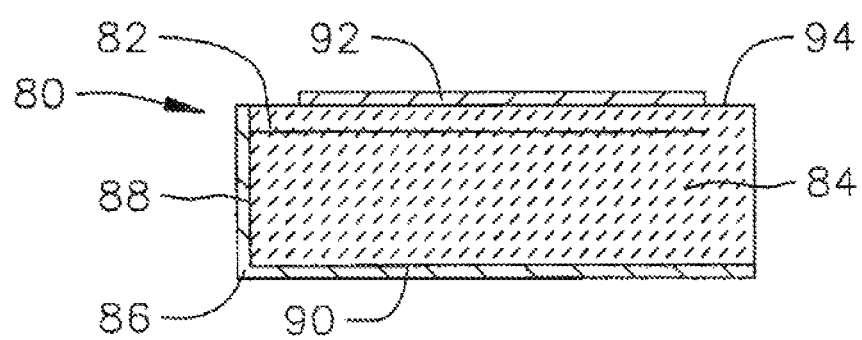
FIG. 9a is a cross-sectional view of another alternative embodiment single layer capacitor of the present invention.
Figure 9B:
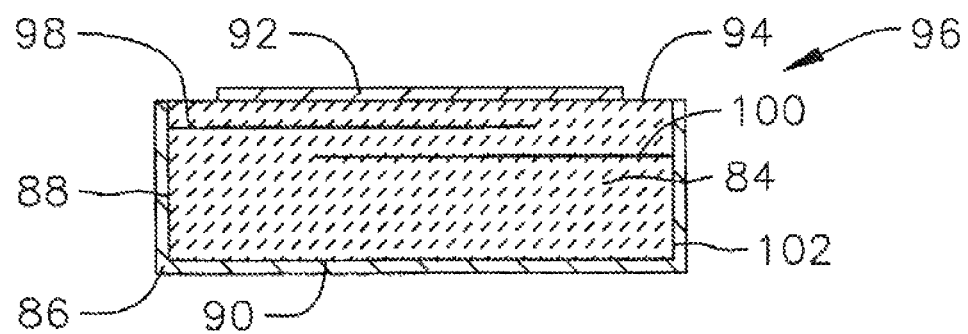
FIG. 9b is a cross-sectional view of another alternative embodiment single layer capacitor of the present invention.

FIG. 9a illustrates a single layer ceramic capacitor 80 having an internal electrode 82 which extends part way across the width of the ceramic body 84. Electrode 82 is in electrical contact with metallization layer 86 along side surface 88. Metallization layer 86 is positioned along side surface 88 and bottom surface 90. A metallization pad 92 is positioned on top surface 94. FIG. 9b illustrates a single layer ceramic capacitor 96 having two internal electrodes 98 and 100 which extend part way across ceramic body 84 which are in electrical contact with metallization layer 86 along side surfaces 88 and 102 respectively. Metallization layer 86 extends along side surface 88 and bottom surface 90 and side surface 102 of the ceramic body. A metallization pad 92 is positioned on top surface 94 of the ceramic body. It is to be understood that in this configuration one or more electrodes can be positioned within the ceramic body that extend partly across the width of the body and are in contact with a conductive metallization layer positioned on at least a portion of at least one of the sides of the ceramic body and a top or bottom surface of the ceramic body. An electrically isolated metallization pad would be positioned on the opposite top or bottom surface of the capacitor. Alternatively, the electrically isolated pad 92 could be positioned on the same surface as another conductive pad.

A method for manufacturing the capacitors as shown in FIGS. 9a and 9b would include placing one or more electrodes between layers of green-state ceramic dielectric sheets, printing top and bottom metallization on the green-state ceramic sheets; cutting the sheet into individual ceramic chips; firing the chips to sinter the layers of dielectric sheet and the electrode with the metallization; metallizing one or more sides of the chip with a conductive paste; firing or curing of the conductive paste and optionally plating all of the metallized surfaces.

Another method of manufacturing the capacitor include the steps of placing one or more electrodes between layers of green-state ceramic dielectric sheets; printing top and bottom metallization on green-state ceramic sheets; cutting the sheet into individual ceramic chips; printing metallization on at least one side of the green-ceramic chips; firing the chips to sinter the layers of dielectric sheet and the electrode with the metallization and optionally plating all of the metallized surfaces.

Another method of manufacturing the capacitor comprises the steps of placing one or more electrodes between layers of green-state ceramic dielectric sheets; printing top and bottom metallization on green-state ceramic sheets; firing the green sheets to sinter the layers of dielectric sheet and electrodes with the metallization; printing a resist or mask on the surface of the fired ceramic sheet; dicing of the fired ceramic sheet to create individual chips and preferential plating or coating of the ceramic chips which may or may not include a step to remove the mask or resist layer.

Referring to FIG. 10a another alternative single layer ceramic capacitor 110 is illustrated. Capacitor 110 includes castellations 112 on two side surfaces 114 and 116. Castellations 112 are removed portions of the ceramic body so that a metallization layer can electrically connect with an electrode buried within the ceramic body. An electrically isolated metallization pad 118 is positioned on the top surface 120 of the ceramic body. FIGS. 10b and 10c illustrate this concept in further detail. Capacitor 122 includes a ceramic body 124 having electrodes 126 and 128 extending from metallization layer 130 positioned on side surface 132 and metallization layer 134 positioned on side surface 136. Capacitor 122 further includes electrode 138 extending part way across the ceramic body 124 but not extending all the way to side surface 136. Castellation 140 is cut into side surface 136 so that the metallization layer 134 can make contact with electrode 138. Top surface 142 includes two metallization pads 144 and 146 positioned on either side. Castellation 140, in this embodiment, is completely filled and is formed when the metallization layer 134 is applied to side surface 136 and top surface 142.

The method for manufacturing the high capacitance single layer ceramic capacitor of FIGS. 10a through 10c include the steps of placing one or more electrodes between layers of green-state ceramic dielectric sheets, cutting or drilling the castellation holes, filling the castellation holes with a conductive paste, printing the top and bottom metallization layers on the green-state ceramic sheets, cutting the sheet into individual ceramic chips exposing the castellation, printing metallization on at least one side of the green-state ceramic chips, firing the chips to sinter the layers of dielectric sheet and the electrode and metallization layers. The capacitor could optionally include a step of plating all the metallized surfaces. As indicated above, the castellation may be completely filled or just have the inside surface coated during the metallization step. There is at least one castellation per capacitor in this embodiment. The castellation filling step may also be combined with the printing of the top and bottom conductive surfaces.

Figure 11A:
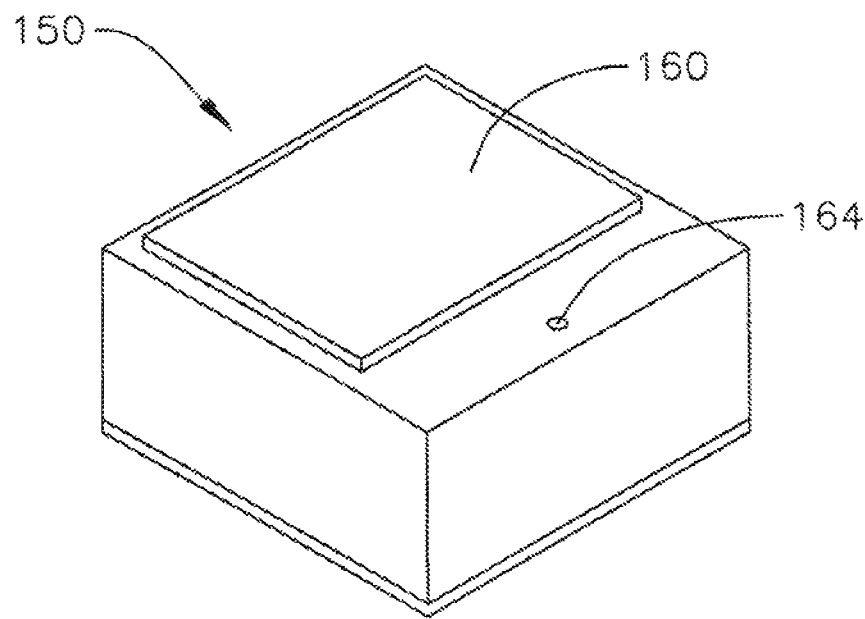
FIG. 11a is a perspective view of another alternative embodiment single layer capacitor of the present invention.
Figure 11B:
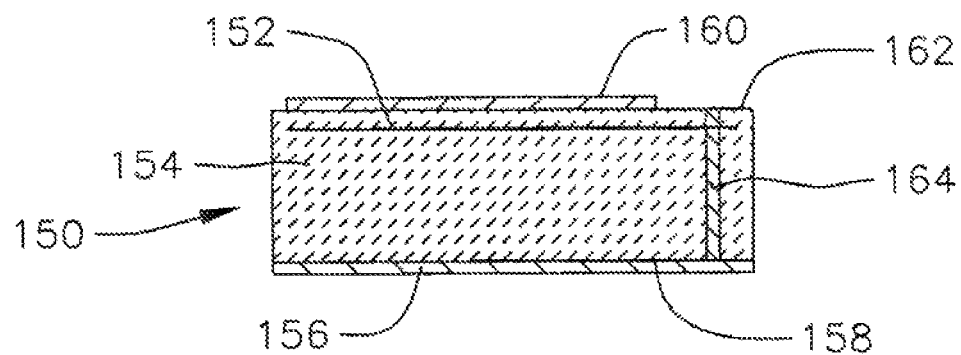

FIGS. 11a and 11b illustrate another alternative high capacitance single layer ceramic capacitor 150 having at least one internal electrode 152 which extends part way across the width of the ceramic body 154. Capacitor 150 has a metallization layer 156 positioned on a bottom surface 158 of the ceramic body and an electrically isolated top pad 160 positioned on the top surface 162 of the ceramic body. The internal electrode 152 is electrically connected to the metallization layer 156 by a through via 164. The via is drilled through the entire height of the ceramic body after all the dielectric sheets are stacked. The via is filled separately with a conductive paste or with metallization as a part of printing the bottom metallization layer 156 or the top conductive pad 160.

Figure 12A:
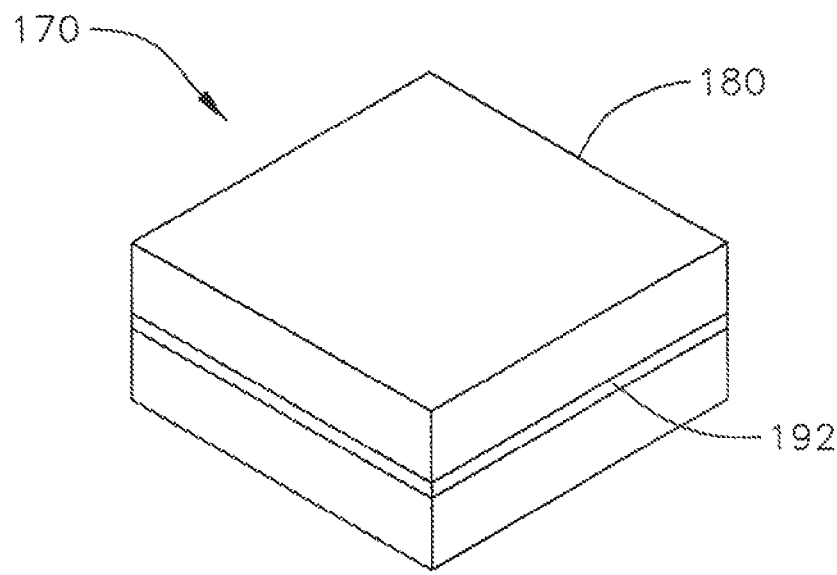
FIG. 12a is a perspective view of another alternative embodiment single layer capacitor of the present invention.
Figure 12B:
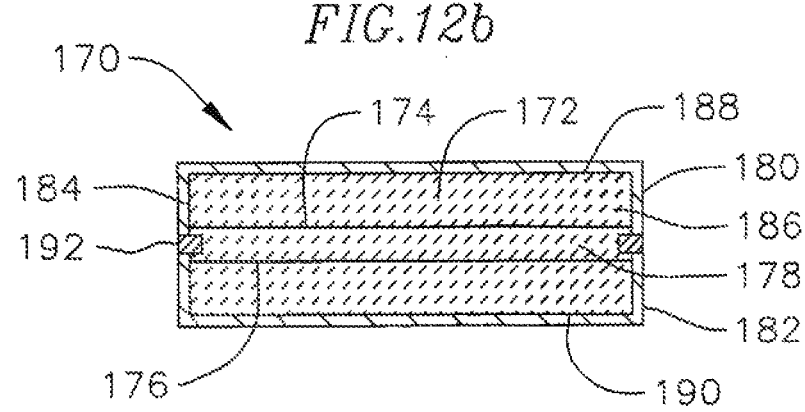

Another alternative embodiment high capacitance single layer ceramic capacitor 170 is illustrated in FIGS. 12a and 12b. Capacitor 170 includes a ceramic body 172 having two electrodes 174 and 176 extending across the entire width of the ceramic body which are separated by a layer of dielectric material of known thickness. Each internal electrode is in contact with a conductive metallization layer 180 and 182 respectively positioned on at least a portion of at least one of the sides and a top and bottom surface of the ceramic body. FIGS. 12a and 12b illustrate the metallization layer 180 position on side surface 184 and 186 and top surface 188. Metallization layer 182 is also positioned on side surface 184 and side surface 186 as well as bottom surface 190. The two opposing metallization layers forming the top and bottom conductive pads are separated by an electrically insulating material 192 that extends around the perimeter of the device penetrating some distance into the ceramic body.

The method for manufacturing capacitor 170 comprises the steps of placing two or more electrodes between layers of green-state ceramic dielectric sheets with the two electrodes being separated by a sheet of green dielectric of known thickness and a web of green-state electrically insulating material that can withstand later metallization steps, cutting the sheet into individual ceramic chips exposing the none-conductive web on all sides of each capacitor, firing the chips to sinter the layers of dielectric sheet and the electrode with the metallization layer and selectively plating all metallized surfaces.

Although the present invention has been described and illustrated with respect to several embodiments thereof, it is to be understood that changes and modifications can be made therein which are within the full intended scope of the invention as hereinafter claimed.

What is claimed is:

1. A high capacitance single layer ceramic capacitor comprising a ceramic dielectric body having at least one internal electrode extending across a portion of the width thereof and in electrical contact with a conductive metallization layer positioned on at least a portion of one side and an entire top or bottom surface of the ceramic body, and at least one electrically isolated metallization pad positioned on an opposite top or bottom surface of the ceramic body and electrically isolated from all electrodes inside the single layer ceramic dielectric body.

2. The capacitor of claim 1, further having two or more electrodes spaced within the ceramic body.

3. The capacitor of claim 1, wherein there are a plurality of metallization pads electrically isolated from one another on the top or bottom surface of the capacitor.

4. The capacitor of claim 3, wherein the metallization pads are different sizes.

5. The capacitor of claim 1, wherein the ceramic body has a castellation having a metallization layer along a side surface for electrical connection with a second electrode.

6. The capacitor of claim 1, wherein the capacitor further comprises side surfaces joining the top and bottom surfaces, and the area of each of the top and bottom surfaces is greater than the area of any one side surface.

7. The capacitor of claim 6, wherein at least one of the length and width of the top and bottom surfaces is greater than a thickness of the capacitor.

8. The capacitor of claim 7, wherein the length and width are less than or equal to 0.090".

9. The capacitor of claim 6, wherein the electrically isolated metallization pad is formed entirely on the top or bottom surface.

10. The capacitor of claim 1, wherein the electrically isolated metallization pad is formed in parallel with a main surface of the internal electrode.

11. The capacitor of claim 1, wherein the capacitor has only a single active capacitive layer.

\* \* \* \* \*